United States Patent
Sailler, Jr. et al.

[11] Patent Number: 5,862,900
[45] Date of Patent: Jan. 26, 1999

[54] TRANSMISSION SYNCHRONIZER MECHANISM

[75] Inventors: Kenneth L. Sailler, Jr., Berkley; Ed Perosky, Sterling Heights; David Salvatori, South Lyon, all of Mich.

[73] Assignee: Chrysler Corporation, Auburn Hills, Mich.

[21] Appl. No.: 855,334

[22] Filed: May 13, 1997

Related U.S. Application Data

[63] Continuation of Ser. No. 554,204, Nov. 6, 1995, abandoned.

[51] Int. Cl.$^6$ .................................................. F16D 23/06
[52] U.S. Cl. ................. 192/53.34; 192/53.4; 192/114 R; 74/339
[58] Field of Search ........................... 192/53.34, 53.341, 192/114 R; 74/339

[56] References Cited

U.S. PATENT DOCUMENTS

| | | |
|---|---|---|
| 1,730,362 | 10/1929 | Gaylord . |
| 1,935,234 | 11/1933 | White .............................. 192/53.361 X |
| 2,085,019 | 6/1937 | Griswold . |
| 2,338,428 | 1/1944 | Guter et al. . |
| 2,460,295 | 2/1949 | Keese . |
| 2,578,740 | 12/1951 | Randol . |
| 3,086,633 | 4/1963 | Winter ................................. 192/53.361 |
| 3,548,983 | 12/1970 | Joraowa ................. 74/339 X |
| 4,059,178 | 11/1977 | Magg et al. .......................... 192/53.34 |
| 4,408,684 | 10/1983 | Gladich . |
| 4,641,734 | 2/1987 | Müller et al. . |
| 4,869,353 | 9/1989 | Ohtsuki et al. ........................ 74/339 X |
| 5,022,506 | 6/1991 | Phillippe . |
| 5,267,636 | 12/1993 | Fielding .................................. 192/53.4 |

FOREIGN PATENT DOCUMENTS

| | | |
|---|---|---|
| 78856 | 8/1960 | France . |
| 1012389 | 12/1965 | United Kingdom ..................... 74/339 |

*Primary Examiner*—Richard M. Lorence
*Attorney, Agent, or Firm*—Thomas G. Pasternak

[57] ABSTRACT

A synchronizer mechanism for synchronizing the rotation of gears between a power input shaft and a power output shaft in a manual transmission includes a hub and a synchronizer sleeve disposed about the hub and moveable relative thereto into and out of engagement with adjacent gears to synchronize the rotation of the adjacent gears with the rotation of the power input shaft. An indexing mechanism is employed for indexing the synchronizer sleeve into and out of engagement with adjacent gears. The indexing mechanism includes a retaining mechanism and a detent portion having a pair of gear engagement positions and a neutral position disposed therebetween. The retaining mechanism is receivable in the gear engagement positions and the neutral position to positively hold the synchronizer sleeve in these positions thereby preventing errant movement of the sleeve as it is moved into and out of engagement with adjacent gears.

18 Claims, 2 Drawing Sheets

TRANSMISSION SYNCHRONIZER MECHANISM

This application is a continuation of application Ser. No. 08/554,204, filed Nov. 6, 1995 now abandoned.

BACKGROUND OF THE INVENTION

1. Field of the Invention

The present invention relates generally to transmissions and, more particularly, to a synchronizer mechanism for synchronizing rotation of gears in a manual transmission.

2. Description of the Related Art

Drive linkages are employed in automotive vehicles between the prime mover, typically an internal combustion engine, and the driven wheels. Such drive linkages generally include a line of rotating components from the rotating output of the engine to the rotating input to the driven wheels. A transmission is typically employed in order to vary the ratio of speeds between the engine output and the driven wheel input. The transmission is shifted to give the operating speeds or power ratios required. A clutch, torque converter or fluid coupling is also employed for interrupting power transmission between the engine output and the driven wheels.

A manual transmission typically includes two shafts, one forming the input shaft to which power is applied and the other forming the output shaft which is ultimately connected, usually through a differential mechanism, to the driven wheels. In its most common form, at least two pair of mated gears are mounted respectively on the input and output shafts, and the respective pair of gears are continuously engaged with one another. One gear of each pair is keyed non-rotatably to its respective shaft while the other is freely rotatable on its respective shaft. Thus, although the gears are continually meshed, with nothing more, rotation of the input power shaft does nothing to cause rotation of the output shaft.

In order to selectively key the rotatably mounted gear to its respective shaft, a gear clutch or synchronizer is located adjacent the gear. A synchronizer mechanism is one common form of such a gear clutch. Synchronizer mechanisms are small clutches maintained engaged by the change-speed control during the time required to obtain the equalization of the angular speeds of the elements to be clutched, e.g., the adjacent gears. In such synchronizer mechanisms, a synchronizer sleeve is disposed about a hub fixed to a shaft. The sleeve is moveable axially relative to the hub on the shaft and into or out of engagement with the adjacent gear. A shifting linkage is manually activated to provide this axial shifting. Cooperating teeth on the coupling member and gear are then engaged in the drive position to key the gear via the coupling member to the shaft. The teeth must be synchronized before shifting can take place and often a main clutch is needed to accomplish this and to interrupt torque transmission through the gear set.

It is not uncommon to encounter excessive play in the movement of the synchronizer sleeve with respect to the hub over many shift iterations. This deficiency is manifested in excessive hub to sleeve tilting which can ultimately result in excessive shift system play causing a popping out of gear condition. In addition, shift system inertial effects can cause jumpout during torque reversals between the gear clutch teeth and synchronizer sleeve.

SUMMARY OF THE INVENTION

It is, therefore, one object of the present invention to provide a synchronizer mechanism for a manual transmission.

To achieve the foregoing objects, the present invention is a synchronizer mechanism for synchronizing rotation of gears between a power input shaft and a power output shaft in a manual transmission. The synchronizer mechanism includes a hub fixed for rotation with a shaft in the transmission and a synchronizer sleeve disposed about the hub and moveable relative thereto parallel to the axis of the shaft into and out of engagement with adjacent gears to synchronize the rotation of the adjacent gears with the rotation of the power input shaft. The synchronizer mechanism further includes an indexing mechanism for indexing the synchronizer sleeve into and out of engagement with the adjacent gears. The indexing mechanism includes at least one retaining mechanism and at least one detent portion disposed internally on the synchronizer sleeve and corresponding to the retaining mechanism. The detent portion has a pair of gear engagement positions and a neutral position disposed therebetween. Each of the pair of gear engagement positions and the neutral position on the detent portion are bounded on either side thereof by stop surfaces. The retaining mechanism is receivable in each of the pair of gear engagement positions and the neutral position of the detent portion and positively holds the synchronizer sleeve in these positions with the stop surfaces preventing errant movement of the synchronizer sleeve as the sleeve is moved between the neutral position and the pair of gear engaged positions into and out of engagement with the adjacent gears to synchronize the rotation of the adjacent gears with the rotation of the input shaft.

One advantage of the present invention is that an improved synchronizer mechanism is provided for a manual transmission. Another advantage of the present invention is that the synchronizer mechanism has a synchronizer sleeve that may be repeatedly moved into and out of engagement with adjacent gears to synchronize their rotation with a rotating shaft without excessive hub to sleeve tilting. Additionally, another advantage of the present invention is that the sleeve is cycled between a neutral position and a pair of gear engaged positions, each position of which is provided with positive stops for preventing the sleeve from popping out of gear. Still another advantage of the present invention is that the additional detent holds the synchronizer sleeve in axial gear position during torque reversals between the clutch teeth and the sleeve, thus preventing loss of torque lock axial engagement when torque is reapplied, and preventing gear jumpout.

Other objects, features and advantages of the present invention will be readily appreciated as the same becomes better understood after reading the subsequent description when considered in connection with the accompanying drawings.

DESCRIPTION OF THE PREFERRED EMBODIMENT(S)

Figure 1:
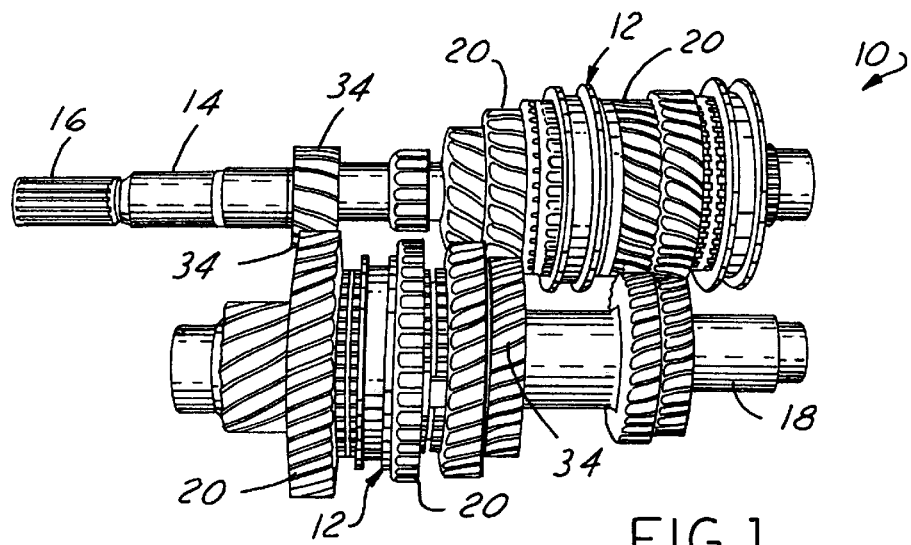
FIG. 1 is a perspective view of a pair of shafts having intermeshed gears in a manual transmission.

Referring now to FIG. 1, a portion of a manual transmission is generally shown at 10. The manual transmission 10 includes synchronizing mechanisms, generally indicated at 12, for synchronizing the rotation of gears 20 disposed between a power input shaft 14 and a power output shaft 18 to be described.

The power input shaft 14 is operatively coupled through a splined portion 16 to a prime mover, such as an internal combustion engine, not shown. Similarly, the output shaft 18 is operatively coupled through a differential to the driven wheels, both of which are not shown. A plurality of gears 20 are carried with either the power input shaft 14 or power output shaft 18 and are intermeshed therebetween for transferring power from the prime mover through the power input shaft 14 to the power output shaft 18 and thus to the driven wheels as is commonly known in the art.

Figure 2:
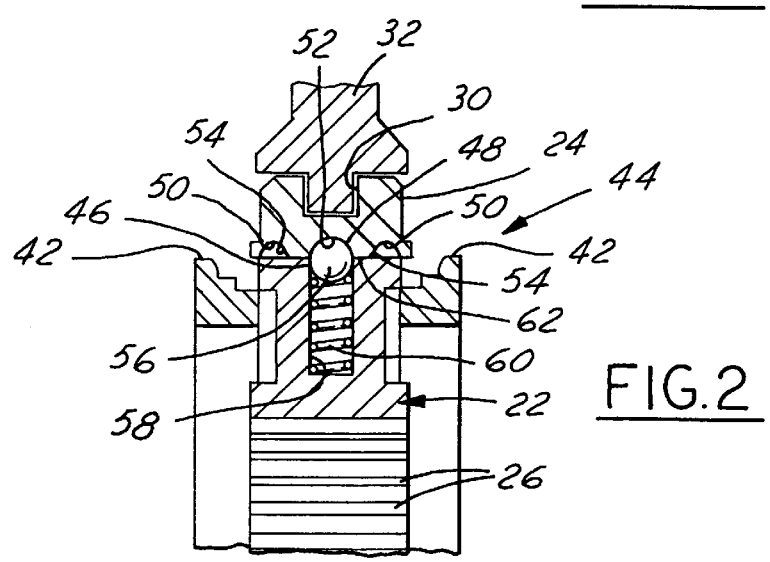
FIG. 2 is a partial sectional view of a synchronizing mechanism according to the present invention.
Figure 5:
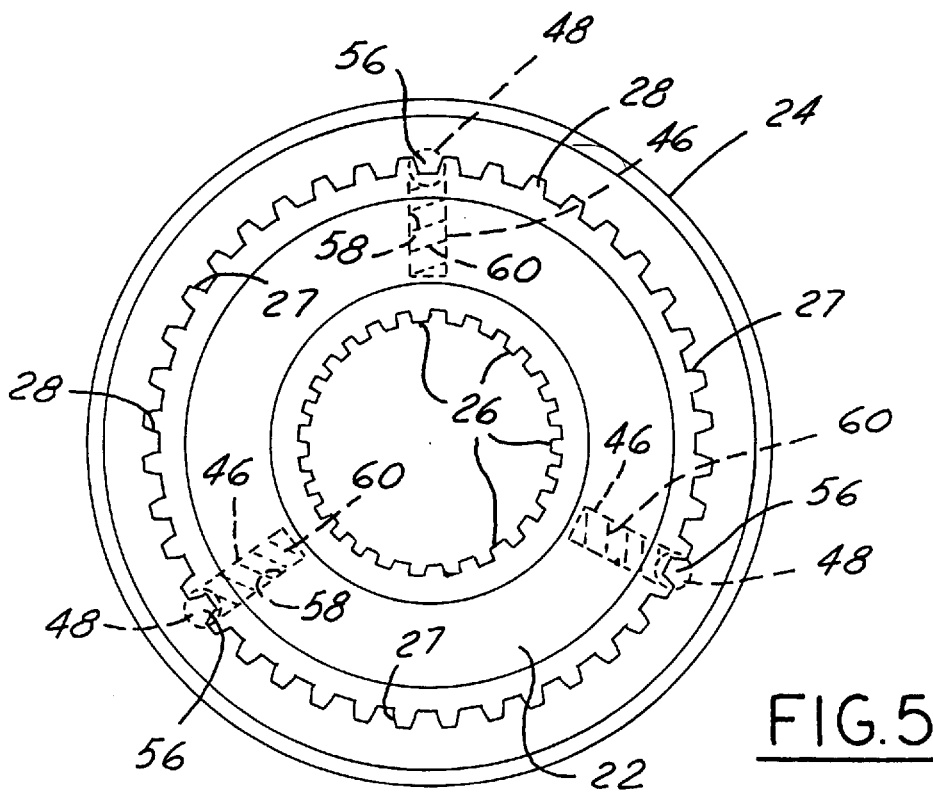
FIG. 5 is a side view of the synchronizer mechanism in FIGS. 2 through 4 illustrating the indexing mechanism in phantom.

The transmission 10 further includes a plurality of synchronizer mechanisms 12 disposed between adjacent gears 20 to synchronize their rotation as will be described. As illustrated in FIG. 2, each synchronizer mechanism 12 includes a hub, generally indicated at 22, fixed for rotation with one of the shafts 14, 18 in the transmission 10 and between pairs of gears 20. Each synchronizer mechanism 12 also includes a synchronizer sleeve 24 disposed about the hub 22 and moveable relative thereto into and out of engagement with adjacent gears 20 to synchronize the rotation of the adjacent gears 20 with the rotation of the power input shaft 14. Each of the hubs 22 include splines 26 on their inner diameter and are fixed to either the power input shaft 14 or the power output shaft 18, as the case may be. The hubs 22 are also externally splined at 27 as shown in FIG. 5. Similarly, each of the synchronizing sleeves 24 include internal splines 28 which cooperate with the external splines 27 of the hub 22. However, the synchronizer sleeves 24 are movable relative to the hub 22 in a direction of the splines 27, 28 and parallel to the axis of the respective shaft 14, 18. To that end, each of the synchronizing sleeves 24 include an external annular groove 30 adapted to receive a shift lever 32 to move the synchronizer sleeve 24 into and out of engagement with the adjacent gears 20.

Figure 3:
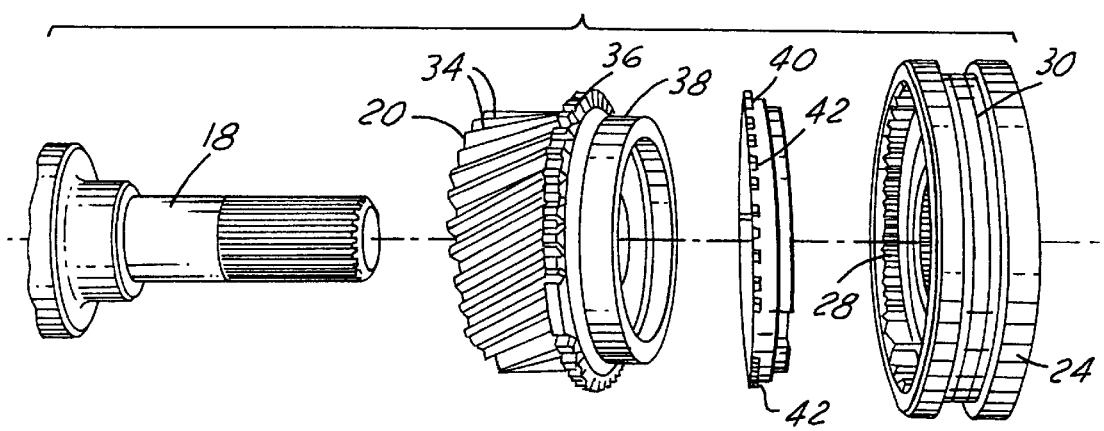
FIG. 3 is an exploded view of a portion of the manual transmission including the synchronizer mechanism of FIG. 2.
Figure 4:
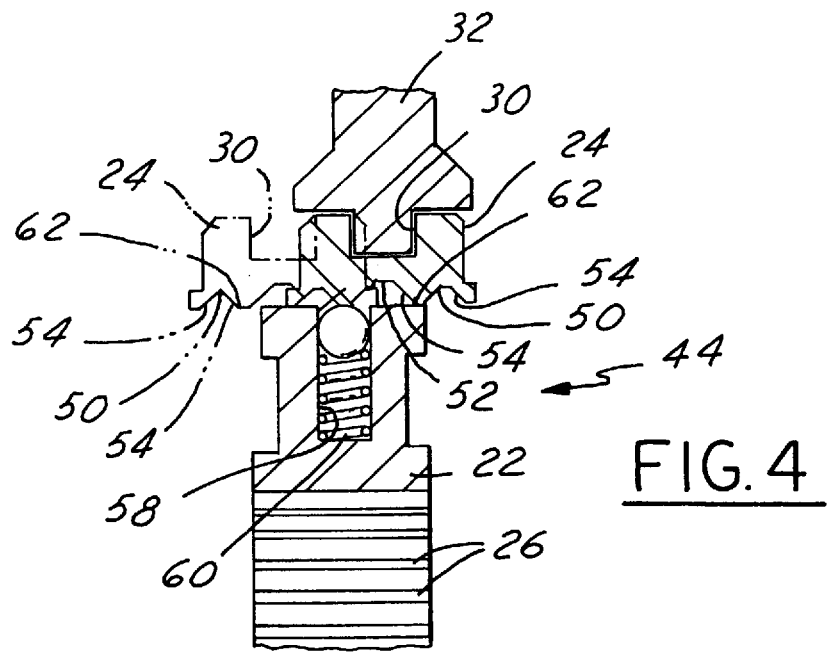
FIG. 4 is a partial sectional view of the synchronizer mechanism according to the present invention.

As illustrated in FIG. 3, each of the plurality of gears 20 carried on the power input shaft 14 and power output shaft 18 include external gear teeth 34 meshed with the teeth 34 of another gear 20 on a different shaft 14, 18. Additionally, each of the gears 20 includes clutch teeth 36 disposed and near one distal end of the gear 20 and adjacent its associated synchronizer mechanism 12. Each of the gears 20 includes a cylindrical cone portion 38 extending axially from the gear 20 and in the direction of the adjacent synchronizer mechanism 12.

An intermediate clutch ring 40 is disposed between each synchronizer mechanism 12 and its adjacent gears 20. The intermediate clutch ring 40 includes external gear teeth 42 and has a conical inner diameter. The clutch ring 40 is carried on and is moveable relative to the cone portion 38. The external gear teeth 42 of the intermediate clutch ring 40 are engaged by the internal splines 28 on the synchronizer sleeve 24 as the synchronizer sleeve 24 is moved into and out of engagement with each adjacent gear 20. At the same time, the intermediate clutch ring 40 is moved relative to the cone portion 38 such that its conical inner surface engages the cone portion 38 to begin synchronization of the gear 20 and such that the clutch teeth 36 of the gears 20 are aligned with the internal splines 28 on the synchronizer sleeves 24 to fully synchronize the rotation of the gears 20 with the input shaft 14.

Each synchronizing mechanism 12 further includes an indexing mechanism, generally shown at 44, for indexing the synchronizer sleeve 22 into and out of engagement with the adjacent gears 20. The indexing mechanism 44 includes at least one, but preferably a plurality of, retaining mechanisms 46. Similarly, the indexing mechanism 44 includes at least one, but preferably a plurality of, detent portions 48 disposed internally on the synchronizer sleeve 24 and corresponding to each retaining mechanism 46. Preferably, the indexing mechanism 44 includes three retaining mechanisms 46 and three detent portions 48 corresponding to each of the retaining mechanisms 46. Each pair of corresponding retaining mechanisms 46 and detent portions 48 are equally spaced relative to an adjacent pair of corresponding retaining mechanisms 46 and detent portions 48 as illustrated in FIG. 5.

Each of the detent portions 48 have a pair of gear engagement positions 50 and a neutral position 52 disposed therebetween. Each of the pair of gear engagement positions 50 and the neutral position 52 of each detent portion 48 are bounded on either side thereof by stop surfaces 54. The retaining mechanisms 46 include a ball 56 which is disposed between the hub 22 and the synchronizer sleeve 24 and into engagement with the pair of gear engagement positions 50 and the neutral position 52 on the detent portion 48.

The retaining mechanism 46 further includes a slot 58 extending radially inward from the outer radial surface of the hub 22 and a coiled spring 60 disposed within the slot 58 and between the hub 22 and the ball 56 to urge the ball 56 into engagement with the pair of gear engagement positions 50 as well as the neutral position 52.

Preferably, each of the balls 56 of the retaining mechanism 46 is receivable in each of the gear engagement positions 50 as well as the neutral position 52 of the detent portions 48 to positively hold the synchronizer sleeve 24 in the pair of gear engagement positions 50 and the neutral position 52. As the synchronizer sleeve 24 is actuated by the shift lever 32, the balls 56 are depressed against the force of the coiled spring 60 and ride against lands 62 located between adjacent stop surfaces 54. The stop surfaces 54 prevent errant movement of the synchronizer sleeve 24 as the sleeve 24 is moved between the neutral position 52 and the pair of gear engagement positions 50 into and out of engagement with adjacent gears 20 to synchronize the rotation of the adjacent gear 20 with the rotation of the input shaft 14. Thus, the synchronizer mechanism of the present invention is structurally very stable. The synchronizer sleeve 24 may be repeatedly moved into and out of engagement with adjacent gears without excessive hub to sleeve tilting. Furthermore, at each of the pair of gear engaged positions as well as the neutral position, the synchronizer sleeve 24 is provided with positive stops by way of the stop surfaces 54 for preventing the sleeve from popping out of gear.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A manual transmission comprising:

a power input shaft;

a power output shaft;

a plurality of gears carried on said power input and power output shafts and intermeshed therebetween for transferring power from said power input shaft to said power output shaft; and a synchronizer mechanism including a hub and a synchronizer sleeve disposed about said hub and moveable relative thereto into and out of engagement with adjacent gears to synchronize the rotation of the adjacent gears with the rotation of said power input shaft, and an indexing mechanism for indexing said synchronizer sleeve into and out of engagement with adjacent gears, said indexing mechanism including three retaining mechanisms and three detent portions equally spaced and disposed internally on said synchronizer sleeve and corresponding to said retaining mechanisms, each of said detent portions including means for specifically locating said synchronizer sleeve axially relative to said hub at a pair of gear engagement positions and a neutral position disposed therebetween; each of said retaining mechanisms receivable at each of said gear engagement positions and said neutral position of each of said detent portions and positively holding said synchronizer sleeve in said pair of gear engagement positions and said neutral position, thereby preventing errant movement of said synchronizer sleeve as said sleeve is moved between said neutral position and said pair of gear engagement positions into and out of engagement with adjacent gears.

2. A manual transmission as set forth in claim 1 wherein said transmission includes a plurality of synchronizer mechanisms, each of which is disposed between a pair of gears.

3. A manual transmission as set forth in claim 2 wherein each of said hubs being externally splined, each of said synchronizing sleeves including an external groove adapted to receive a shift lever to move said synchronizer sleeve between said neutral and said gear engaged positions and internal splines cooperating with said external splines of said hub.

4. A manual transmission as set forth in claim 3 wherein each of said plurality of gears carried on said power input and power output shafts includes external gear teeth meshed with the teeth of a gear on a different shaft and clutch teeth disposed near one distal end of said gear and adjacent said synchronizer mechanism, each of said gears including a cylindrical cone portion extending axially from said gear and in the direction of said synchronizer mechanism;

an intermediate clutch ring disposed between said synchronizer mechanism and said adjacent gears, said intermediate clutch ring having external gear teeth and a conical inner diameter and being carried on and moveable relative to said cone portion, said external gear teeth of said intermediate clutch ring engaged by said internal splines on said synchronizer sleeve as said synchronizer sleeve is moved from said neutral position to said gear engaged positions and said intermediate clutch ring is moved relative to said cone portion such that said conical inner surface of said intermediate clutch ring engages said cone portion to begin synchronization of said gear and such that said clutch teeth of said gears are aligned with said internal splines on said synchronizer sleeve to fully synchronize the rotation of said gears and said input shaft when said synchronizer sleeve is moved from said neutral position to said gear engaged positions.

5. A manual transmission as set forth in claim 1 wherein each of said retaining mechanisms include a ball biassed between said hub and said synchronizer sleeve and into engagement with said pair of gear engagement positions and said neutral position on said detent portion.

6. A manual transmission as set forth in claim 5 wherein each of said retaining mechanisms include a slot extending radially inward from the outer radial surface of said hub and a coiled spring disposed within said slot and between said hub and said ball to bias said ball into engagement with said pair of gear engagement positions and said neutral positions on said detent portion.

7. The manual transmission as set forth in claim 6, wherein said ball has a radius and further wherein each of said first, second and third recesses is concavely curved in an axial direction and has a radius of curvature substantially equal to said radius of said ball.

8. The manual transmission as set forth in claim 7, wherein said hub includes a radially extending slot axially retaining said ball.

9. A synchronizer arrangement for a manual transmission having a first shaft, a second shaft, and a plurality of gears carried on the first and second shafts, the plurality of gears intermeshed for transferring power therebetween, the synchronizer arrangement comprising:

a hub fixed for rotation on the first shaft; and a synchronizer sleeve slidably coupled to said hub and axially movable thereon in a first direction from a neutral position to a first operative position wherein said shift sleeve operatively couples with a first gear of the plurality of gears, and a second direction from said neutral position to a second operative position wherein said shift sleeve operatively couples with a second gear of the plurality of gears; and means for specifically locating said synchronizer sleeve axially relative to said hub at each of said first operative position, said second operative position and said neutral position.

10. The synchronizer arrangement for a manual transmission of claim 9, wherein said means for specifically locating said synchronizer sleeve axially relative to said hub includes a locating member biased into engagement with an internal surface of said synchronizer ring by a biasing force and a plurality of recesses provided on said internal surface of said synchronizer sleeve, said plurality of recesses sized and arranged to receive said locating member so as to selectively and positively locate said hub and said synchronizer sleeve.

11. The synchronizer arrangement for a manual transmission of claim 10, wherein said means for specifically locating said synchronizer sleeve axially relative to said hub includes means for substantially preventing axial translation of said synchronizer sleeve relative to said hub when said synchronizer sleeve is in either of said first and second operative positions.

12. The synchronizer arrangement for a manual transmission of claim 11, wherein said locating member comprises a ball biased into engagement with said internal surface of said synchronizer ring.

13. The synchronizer arrangement for a manual transmission of claim 12, wherein said ball has a radius and further wherein each recess of said plurality of recesses is concavely curved in an axial direction and has a radius of curvature substantially equal to said radius of said ball.

14. The synchronizer arrangement for a manual transmission of claim 13, wherein said means for specifically locating said synchronizer sleeve axially relative to said hub comprises means for preventing axial translation of said ball relative to said hub.

15. The synchronizer arrangement for a manual transmission of claim 14, wherein means for preventing axial translation of said ball relative to said hub comprises a radially extending slot provided in said hub, said radially extending slot receiving a portion of said ball.

16. A synchronizer arrangement for a manual transmission having a first shaft, a second shaft, and a plurality of gears carried on the first and second shafts, the plurality of gears intermeshed for transferring power therebetween, the synchronizer arrangement comprising:

a hub fixed for rotation on the first shaft, said hub including a radially extending slot;

a synchronizer sleeve slidably coupled to said hub and axially movable thereon in a first direction from a neutral position to a first operative position wherein said shift sleeve operatively couples with a first gear of the plurality of gears, and a second direction from said neutral position to a second operative position wherein said shift sleeve operatively couples with a second gear of the plurality of gears; and a locating member interdisposed between said hub and said synchronizer sleeve, said locating member being axially retained by said radially extending slot and spring biased into engagement with said synchronizer sleeve;

said synchronizer sleeve including first, second and third recesses formed on an internal surface thereof, said first, second and third recesses sized and arranged to receive said locating member for selectively and specifically locating said synchronizer sleeve axially relative to said hub.

17. The synchronizer arrangement for a manual transmission of claim 16, wherein said locating member comprises a sphere which is spring biased into engagement with said internal surface of said synchronizer ring.

18. The synchronizer arrangement for a manual transmission of claim 17, wherein said sphere has a radius and further wherein each of said first, second and third recesses is concavely curved in an axial direction and has a radius of curvature substantially equal to said radius of said sphere.

* * * * *